May 28, 1968 H. J. CARPENTER ETAL 3,385,140
FLAT MULTI-CONDUCTOR STRIPPING APPARATUS
Filed June 15, 1967 5 Sheets-Sheet 1

INVENTORS.
KENNETH L. DUNN
HUBERT J. CARPENTER
BY *F. P. Keiper*
ATTORNEY.

INVENTORS.
KENNETH L. DUNN
HUBERT J. CARPENTER
BY  *signature*
ATTORNEY.

INVENTORS.
KENNETH L. DUNN
HUBERT J. CARPENTER
BY  E. P. Kerpien
ATTORNEY.

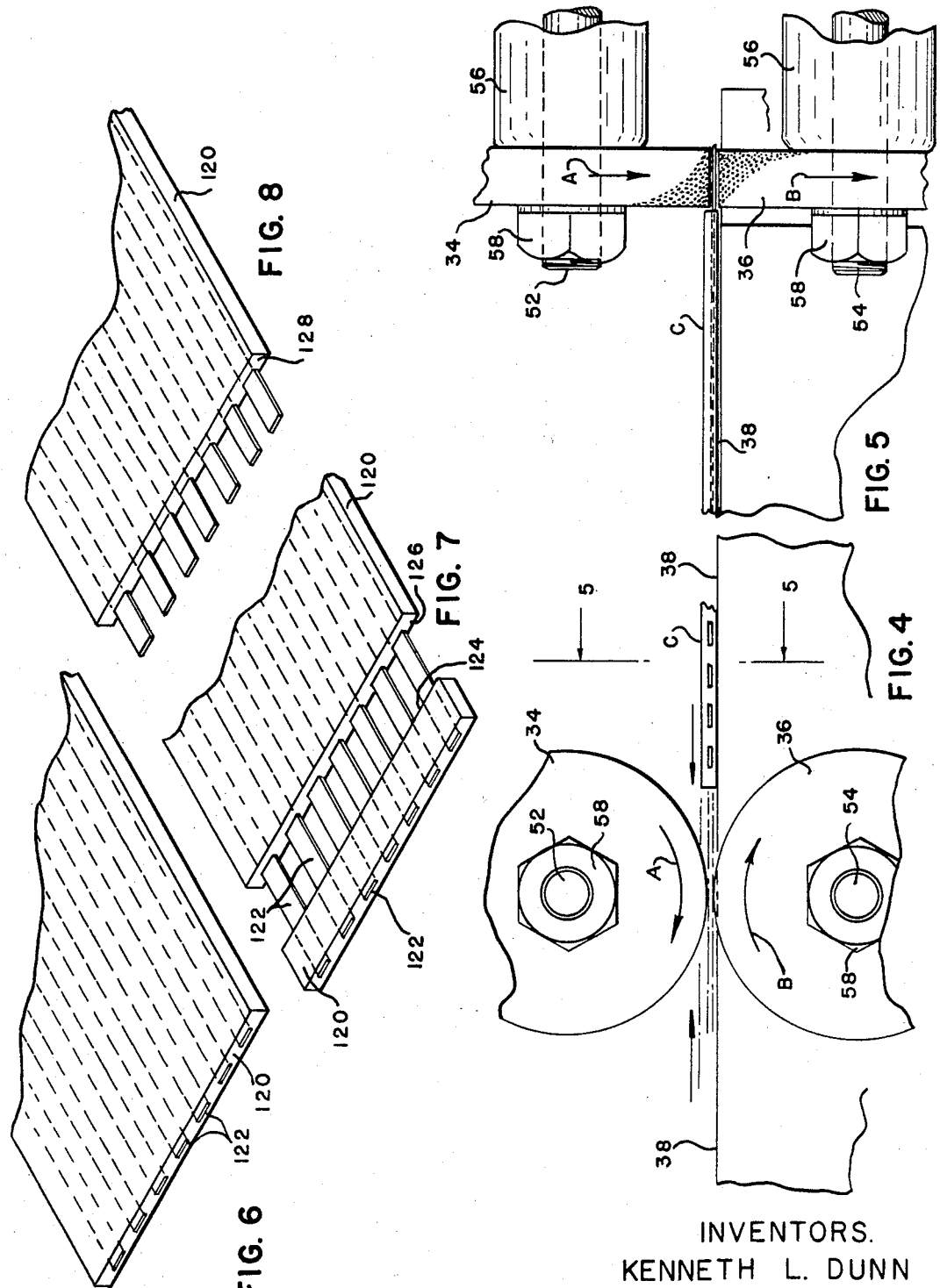

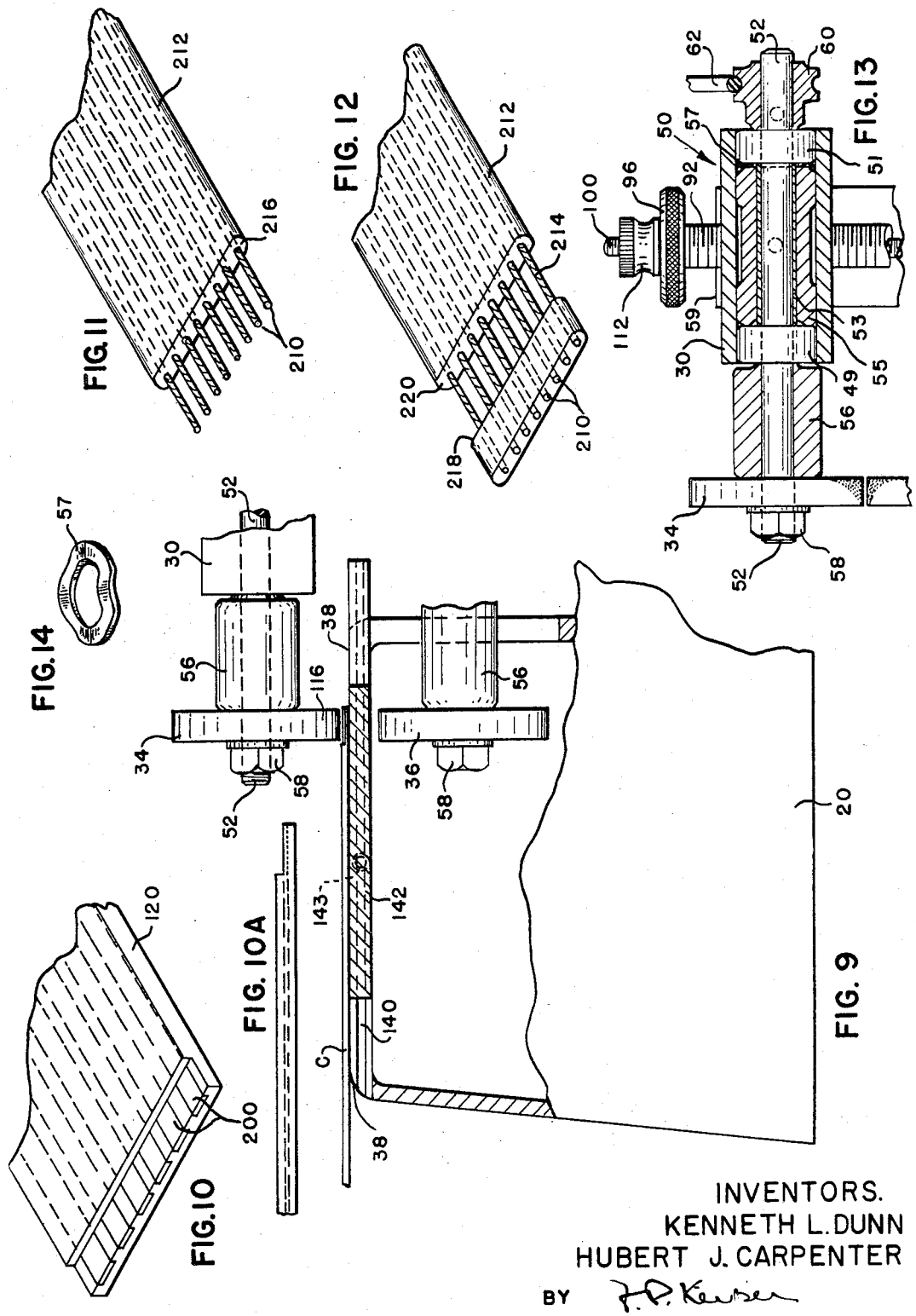

United States Patent Office 3,385,140
Patented May 28, 1968

3,385,140
FLAT MULTI-CONDUCTOR STRIPPING
APPARATUS
Hubert J. Carpenter, Manlius, and Kenneth L. Dunn,
Fayetteville, N.Y., assignors to Carpenter Manufacturing Co. Inc., Manlius, N.Y., a corporation of New York
Filed June 15, 1967, Ser. No. 646,311
8 Claims. (Cl. 81—9.51)

ABSTRACT OF THE DISCLOSURE

Insulation stripper for use in the stripping of multi-conductor cable having conductors disposed in side-by-side relation and in a common plane, comprising a pair of parallel shaft bearings and shafts rotating at high speed in the same direction with like fiberglass insulation stripping wheels mounted on the shafts adjacent one another but spaced apart, screw adjustment means for fixing the spacing between the adjacent peripheries of the wheels to correspond to the thickness of the conductors being stripped of insulation, whereby the adjacent peripheral elements of the wheels move in opposite directions to oppose the stripping forces exerted upon the opposite sides of the cable inserted between the wheels for insulation stripping.

---

This invention relates to wire stripping, and more particularly the stripping of insulation from multi-conductor cables wherein the conductors are disposed side-by-side in a common plane.

The stripping of the insulation from multi-conductor cables wherein the conductors are disposed in side-by-side relationship in a common plane, and the insulation, as for example in the form of plastic is to be removed, not only from both sides of the cable but also from between the adjacent conductors, has presented problems. Where each conductor of such a multi-conductor cable comprises a twisted multiplicity of filaments, it is desirable that each stripped conductor maintain its twisted state. In addition, upon stripping, whether the conductors each consist of a plurality of twisted filaments, or a solid flat or ribbon like conductor, the ends of the conductors exposed by the stripping action should not be disturbed, in regard to the parallel spaced arrangement thereof such as existed before the insulation is removed.

Fiberglass stripping wheels operating simultaneously on opposite sides of the conductor with their stripping portions moving in the same direction, and the wheels rotating in opposite directions have been employed with the axis of the wheels arranged crosswise of the axes of the conductors have been employed. When so employed, the wheels tend to drag the conductor, and it is necessary to securely anchor the conductor during such stripping. Such stripping cannot provide a sharp termination of the insulation where stripping commences, because of the diameter of the stripping wheels. Such stripping action further tends to comb out or untwist the fine filaments of twisted conductors, and tends to tear out the insulation between conductors.

The present invention is directed to the utilization of stripping wheels rotating in the same direction, the cylindrical stripping surfaces of the wheels being spaced apart by the conductor thickness. In inserting a conductor of the multi-conductor flat type between such wheels, the abrading surfaces of the wheels are moving oppositely, and neutralize any tendency to drag the conductor between the wheels. In fact where the peripheral speeds of the wheels are exactly the same but in opposite directions, which appears to be the preferred condition, no tendency to move an insulated flat multi-conductor cable brought between the wheels is apparent, and instead of feeding the conductor and tangentially into the space between the wheels as was the case where the wheels rotated in opposite directions and their adjacent periphery moved in the same direction, the present invention contemplates moving the conductor crosswise or diagonally with respect to the spaced wheels. Thus instead of requiring wheels of the full width of the cable for efficient stripping action, the wheels may be of a width corresponding to the minimum length of the strip desired. Since the abrasive action of the two wheels is substantially equal and opposed, any tendency of the wheels to effect movement of the cable brought between the wheels is completely eliminated, and stripping is effected by moving the cable between the wheels where stripping is desired, manually, and almost without effort, and under complete control of the operator. Since the conductor can be moved crosswise or diagonally with respect to the axes of the wheels, a clean and sharp termination of the insulation where the strip commences is possible, merely by utilizing stripping wheels having cylindrical stripping surfaces terminating at either end by the planar end faces of the wheels.

The above and other novel features of the invention will appear more fully hereinafter from the following detailed description when taken in conjunction with the accompanying drawings. It is expressly understood that the drawings are employed for purposes of illustration only and are not designed as a definition of the limits of the invention, reference being had for this purpose to the appended claims.

In the drawings, wherein like reference characters indicate like parts:

FIGURE 4 is a fragmentary diagramnatic enlarged front view of the working area of the stripping wheels and table with the travel of the cable work piece indicated;

FIGURE 5 is a fragmentary diagrammatic enlarged side view as seen from the line 5—5 of FIGURE 4, of the working area of the stripping wheels, and table with the cable work piece indicated with a stripped end disposed between the wheels.

FIGURE 6 is a greatly enlarged perspective view of the end of a ribbon type multiple cable with flat conductors which the apparatus is adapted to strip;

FIGURE 7 is a greatly enlarged perspective view of the end of a cable as shown in FIGURE 6, after stripping has taken place intermediate of the ends;

FIGURE 8 is a greatly enlarged perspective view of the end of a cable as shown in FIGURE 6 wherein the end insulation has been stripped from the cable;

FIGURE 9 is a fragmentary view with parts in section showing the appaartus adjusted to strip one side of the insulation;

FIGURE 10 is a greatly enlarged perspective view of the end of the cable as shown in FIGURE 6 after stripping one side of the insulation from the cable end;

FIGURE 10A is a side edge view of the conductor of FIGURE 10;

FIGURES 11 and 12 illustrate ribbon cables wherein the conductors are stranded and twisted instead of flat, FIGURE 11 showing an end strip, and FIGURE 12 showing a strip effected intermediate the ends;

FIGURE 13 is a sectional view through one of the shaft bearing assemblies; and

FIGURE 14 is an enlarged perspective view of a spring washer employed in each of the shaft bearing assemblies.

Figure 1:
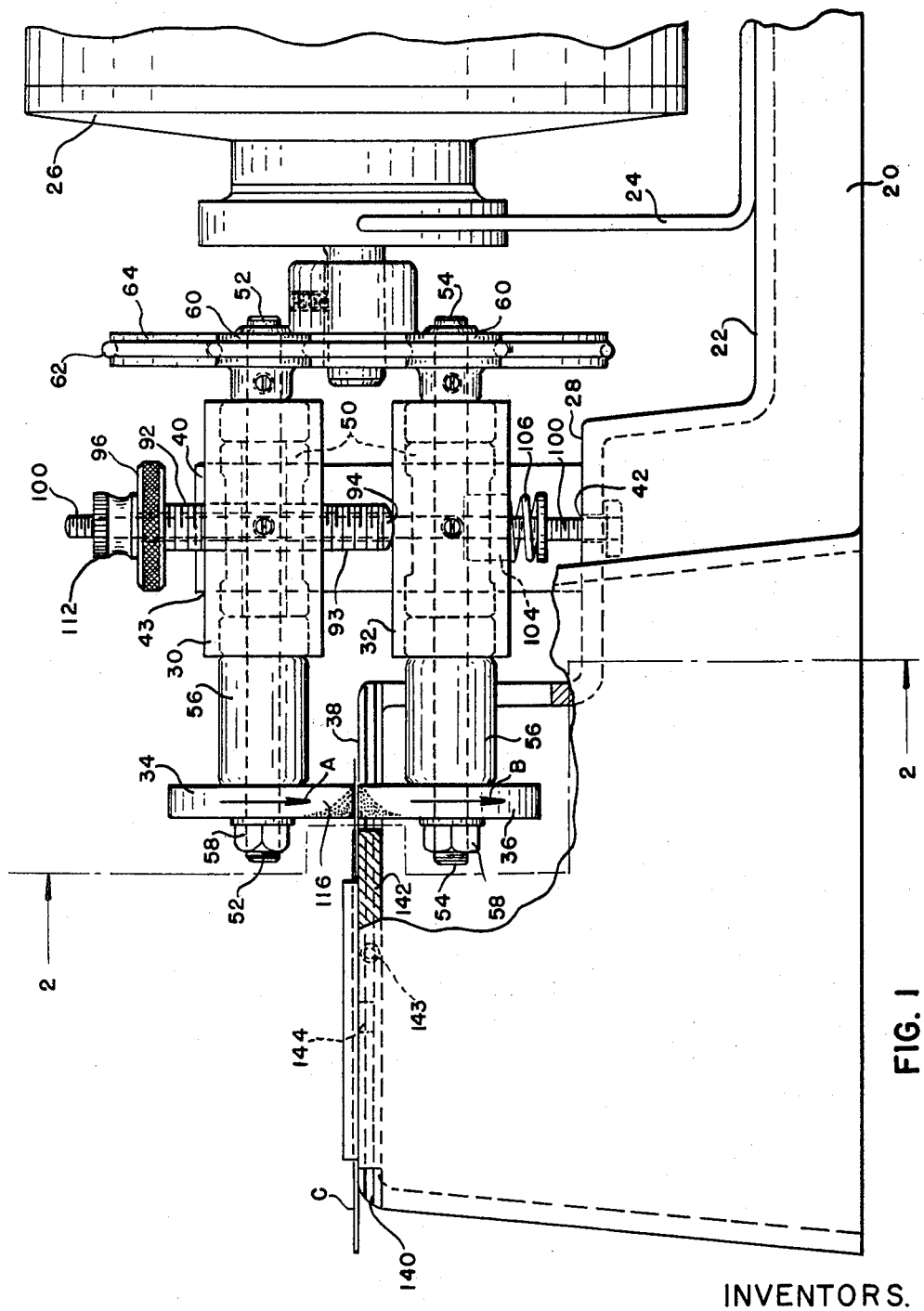
FIGURE 1 is a side elevational view of the apparatus with parts broken away to show the mechanism.

Referring to FIGURE 1, there is shown a rigid base 20 having a stepped formation, one level 22 supporting a motor bracket 24 and motor 26, an intermediate level 28 serving to support bearing support arms 30 and 32 for stripping wheels 34 and 36, and a table level 38, for supporting flat cables in position for movement into stripping relation with respect to the wheels 34 and 36.

To accurately support the wheels in proper relation to the level of the table surface, there is provided a post 40 mounted on the base level 28 as at 42. The upper and lower arms 30 and 32 are slotted as at 43 to embrace the post 40, and are pivoted on heavy pins 44 and 46 secured in the post by setscrews 48. The other ends of the arms are provided with bearing assemblies 50, and wheel shafts 52 and 54 respectively, each having a hub 56 forming a mount for the fiberglass stripping wheels 34 and 36 respectively, the wheel being held on their respective shafts by nuts 58 threaded on the shafts 52 and 54. The opposite ends of the shafts are provided with like pulleys 60, over which travels a drive belt 62 driven by the motor pulley 64. It will be seen that the drive ratio is such as to drive the shafts 52 and 54 at high speed, as compared to the speed of the motor 26, which if desired may be that of a standard two pole induction motor, or about 3450 r.p.m. or any other speed, provided the drive ratio is varied accordingly.

It will be seen that the stripping wheels lie in a common plane and rotate in the direction of arrows A and B, with motor rotation in the direction of arrow C, and that the shafts 52 and 54 lie on parallel axes, accurately maintained.

In order to accurately maintain the axes of shafts 52 and 54, bearing assemblies 50 as shown in FIGURE 13 are employed. In each assembly, ball bearings 49 and 51 have their inner races spaced by a sleeve 53 and the inner races are in fixed position on the shaft between pulley 60, sleeve 56 wheel 34 and nut 58. The outer races are spaced by a sleeve 55, and a partially compressed spring washer 57 so as to resiliently spread the outer races to assure preloading of the ball bearings 49 and 51. The sleeve 55 of each bearing assembly is held in its respective arm by a setscrew 59, and axially locates the stripping wheel 34 by its bearing against the outer raceway of bearing 49. By the preloading thus provided precise and accurate spacing between the stripping wheels 34 and 36 can be maintained.

A typical conductor, adapted to be stripped by the apparatus is shown in FIGURE 6, greatly enlarged. One process by which such conductors can be made is shown in U.S. Patent 3,168,617. The actual conductors 13 of such cables can be of a thickness as little as 0.002 inch, and of a width of as little as 0.025 inch, with spacing or pitch between adjacent conductors of as little as .050 inch. With conductors of such size, the thickness of the cable and its insulation would lie in the order of 0.007 inch, and the overall width of the cable for seven conductors as shown would be about .040 inch. The foregoing dimensions are merely selected for illustrative purposes only to indicate the delicate nature of the problem of stripping the polyester or other plastic insulation from such cables, which in practice may be transparent.

Figure 2:
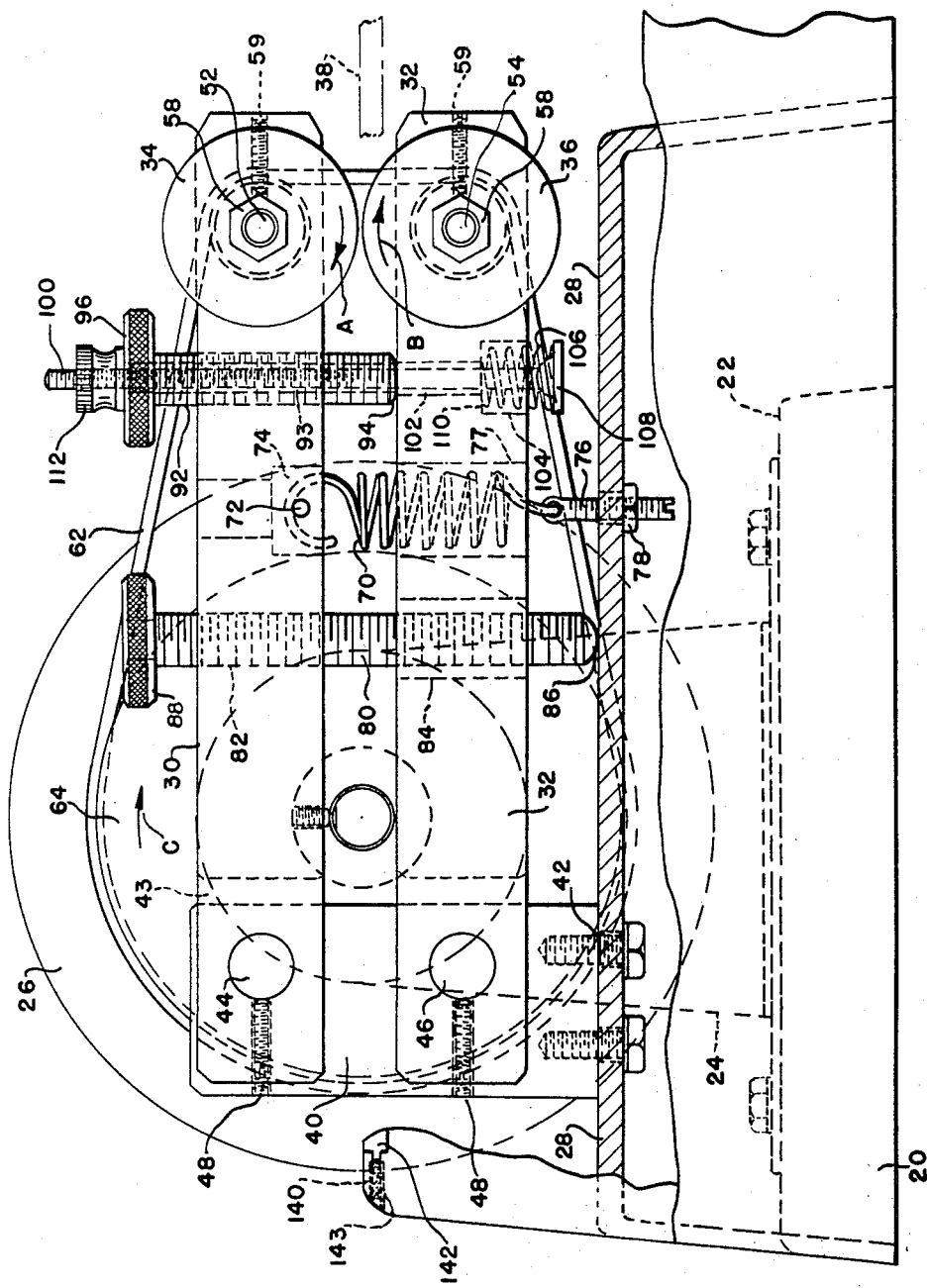
FIGURE 2 is a sectional view taken substantially on the line 2—2 of FIGURE 1, and with the work table completely removed in front of the wheel support mechanism.

It will be noted that with the rotation of the wheels in the directions indicated by arrows A and B, the wheels necessarily are adjusted close to one another, but without touching. Provision for accurate adjustment of both wheels with respect to one another, and with respect to the table level 38 is shown FIGURE 2, wherein the upper arm 30 is resiliently urged downwardly by a helical tension spring 70 hooked at its upper end upon a pin 72 traversing a recess 74 in the arm. The lower end of the spring is adjustably tensioned by the threaded eye 76 and its nut 78, below the base level 28 and extends through an aperture 77 in the arm 32. The actual height of the arm is fixed by the heavy screw 80 threaded in the upper arm as at 82, and projecting through an aperture 84 in the lower arm 32, the screw having a spherical abutment end 86 bearing against the base 28, and a knurled knob 88 at its other end for convenient adjustment.

The spacing between the stripping wheels, which requires considerable accuracy is regulated by the screw 92, which is threaded through the upper arm 30, and is provided with a spherical abutment end 94 adapted to engage the lower arm 32. Such screw is provided with a knurled knob 96 for facilitating accurate adjustment. In the form shown, the screw 92 has a bore 93 through which extends a tension adjusting screw 100, such screw extending freely through both the bore 93 and an aperture 102 in the lower arm 32. The aperture 102 is enlarged as at 104 on the underside to receive a compression spring 106 between the head 108 of the screw 100 and the shoulder 110 formed by the recess enlargement. The upper end of the screw 100 is provided with a knurled nut 112 on its upper end, adapted to bear upon the knurled knob 96. Any desired tension between the arms 30 and 32 to yieldingly hold them as spaced by the screw 92, can be had by adjusting the nut 112.

Figure 3:
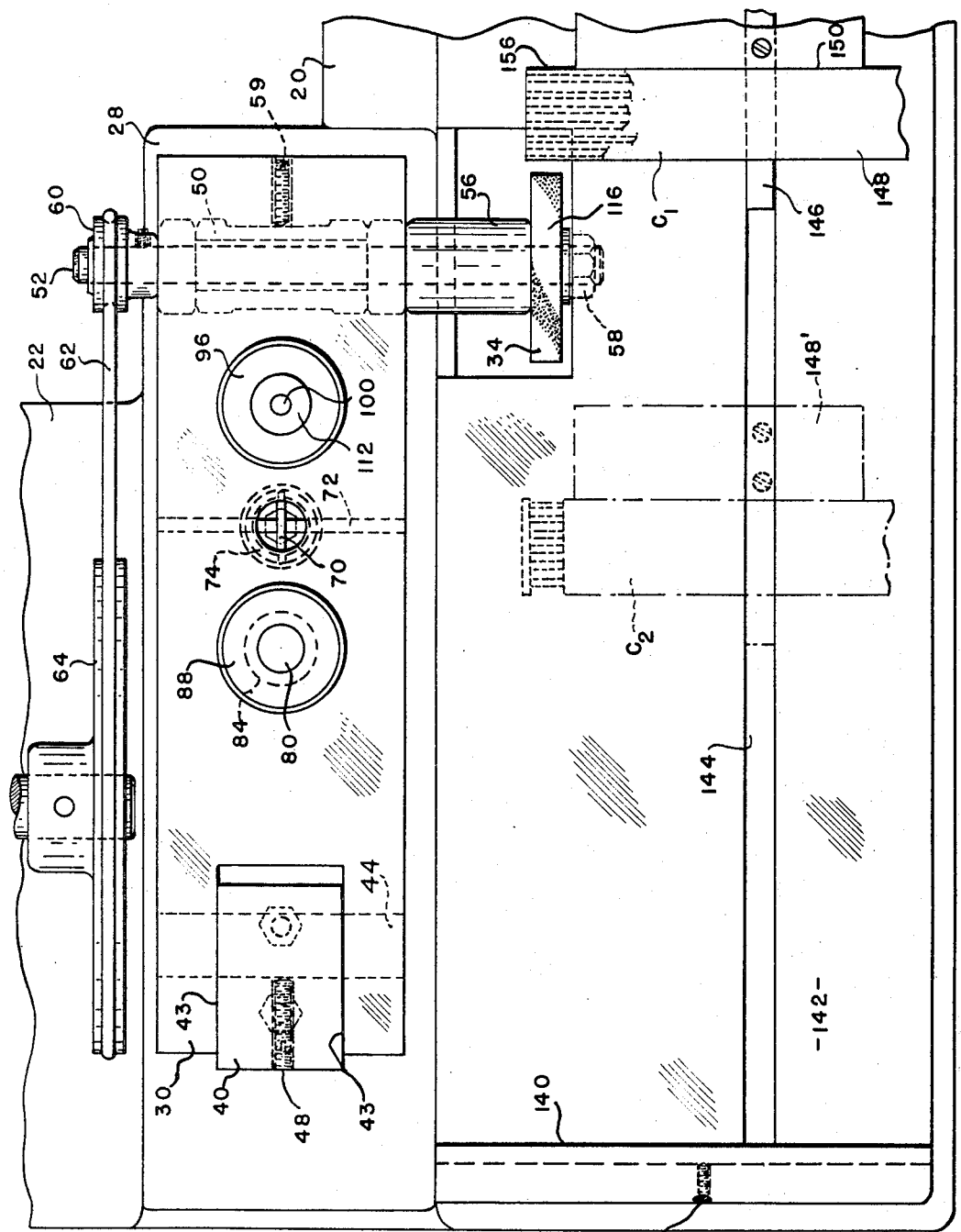
FIGURE 3 is a fragmentary plan view of the wheel support and drive mechanism and adjacent table.

As shown in FIGURE 3, the abrading fiberglass wheels, may be of a thickness to correspond to the length of stripping desired, and as indiacted may be a quarter of an inch. The stripping faces 116 of the wheels will be dressed to a true cylindrical surface, and the wheels when correctly adjusted for a cable whose conductors are flat and about .002 inch thick, will be adjusted so as to be spaced .002 inch, and the horizontal plane tangent to the upper surface of the lower wheel will be slightly above the table level, by the thickness of insulation on one side of the cable. Where the overall thickness is .007 inch, the spacing would be .025 inch.

With the wheels so adjusted, the end of a cable C to be stripped, is slid along the table top from a position C–1 to the position C–2, so that the cable end passes between the oppositely moving cylindrical wheel faces, as indicated in FIGURES 4 and 5. The opposite movement of the adjacent wheel faces counteracts any tendency to oppose or affect the movement of the cable between the wheels, and the insulation is instantly removed from both sides and from between the adjacent conductors, and the stripped cable has the appearance of the cable shown in FIGURE 8. If a strip inwardly of the end is desired as shown in FIGURE 7, it is merely necessary to pass that portion of the conductor cable ribbon between the wheels, where the stripping action is desired.

It would appear in FIGURE 7 that the insulation remaining on both sides of the strip would tend to support the delicate conductors during the strip and prevent the disarray of the conductors during stripping. However, no such tendency to cause a disarray is present, whether the bared cable ends are supported as in FIGURE 7, or completely unsupported as in FIGURE 8.

The stripping of the insulation 120 of the conductors 122 leaves a sharp clean break as indicated at 124 and 126 in FIGURE 7 and 128 in FIGURE 8. The material in the plane of and between the conductors is removed by the action of stripping the outer layers. Where such material is adhesive, and the outer layers are thin plastic ribbons, it appears that the bonding action of the adhesive is more or less pulverized or powdery form during the stripping action. Any suitable apparatus for collecting or disposing of the trash so formed may be provided. In practice, the peripheral speeds of the stripping wheels may be in the order of 100 feet per second.

While transverse stripping has been shown, stripping on the diagonal can be easily effected, by merely feeding the conductor through the space between the wheels while angularly disposed to the extent desired.

To accommodate wheels of different thicknesses, the table may be supported on the base in grooves 140 and 141, one being shown at one end of the base and table. Any adjustment of the table plate 142 toward or away from the wheels may be permitted by loosening of a setscrew at either end 143, and a selected position held by tightening the setscrew. In order to facilitate the guiding of conductors through the wheels at a true right angle, or any other angle, the base may have a groove 144 or guide track to receive a slide 146 to which may be affixed a shoulder block 148. The slide and block may be such that the surface 150 of the block is parallel with the wheel spindles for a transverse strip. Thus by placing the edge 156 of a cable tape to be stripped against the edge 150 of the block 148, the block can be slid from the positions shown in FIGURE 3 to that shown at 148', thus moving the cable through the wheels, and assuring a transverse strip across the ribbon cable end.

If stripping one side of a conductor of the type shown in FIGURE 6 is desired, for example in the manner shown in FIGURES 10 and 11, where the conductors are shown as bare on one side only as at 200, the apparatus may be adjusted as indicated in FIGURE 9, the wheel 36 being lowered sufficiently to permit the table 142 to be moved under wheel 34, on the guides 140 and locked by setscrew 143, after which the abrading surface of the wheel is adjacent to a proper height to abraid away the upper layer of insulation as indicated in FIGURES 10 and 11. When the apparatus is so employed there is a side thrust from the wheel 34 which is not neutralized. However with the conductor disposed flat upon the table, the friction between the back side of the cable, beneath where stripping is being effected, tends to resist the side movement of the wheel except as is desired and effected by the operator in moving the cable into the wheel to provide the crosswise strip.

In FIGURES 11 and 12 multi-conductor cable of the flat type having twisted multi-strand conductors 210 embedded in insulation such as plastic 212 is shown. In FIGURE 11, the wire ends have had their insulation stripped by the same procedure as described in regard to the conductor strip shown in FIGURE 8, and where the stripped conductors 214 are intermediate the ends of the cable, as in FIGURE 12, the procedure is the same as that described in conjunction with the conductor shown in FIGURE 7. In each case a clean sharp strip as is indicated at 216, 218 and 220 is effected, and the twist of the conductors is undisturbed.

While a single form of the invention has been illustrated and described, it is to be understood that the invention is not limited thereto. As various changes in the construction and arrangement may be made without departing from the spirit of the invention, as will be apparent to those skilled in the art, reference will be had to the appended claims for a definition of the limits of the invention.

What is claimed it:

1. An insulation stripper for use in the stripping of multi-conductor cable wherein the conductors are disposed in side-by-side relation and in common plane, which comprises a pair of shaft bearings, shafts journalled in said bearings with their axes lying in a common plane, like fiberglass insulation stripping wheels mounted on said shafts adjacent each other but spaced apart, means for maintaining a predetermined uniform spacing between the adjecent peripheral elements of said wheels corresponding substantially to the thickness of the conductors being stripped, and power means for driving said shafts at like speeds and in the same direction, whereby the adjacent peripheral elements of said wheels move in directions opposite to one another at like speeds to oppose the stripping forces exerted upon the opposite sides of the cable inserted between the wheels for insulation stripping.

2. A stripper according to claim 1, comprising a work table having a planar surface extending across and at right angles to the common plane of the axes of said wheels, said planar surface being parallel with a plane tangential to the peripheral surface of one of said wheels.

3. A stripper according to claim 1 wherein the plane of the work surface is spaced from the tangential plane by the thickness of the insulation to be stripped on one side of the cable.

4. A stripper in accordance with claim 1 wherein the axes of the two shafts are parallel, and spaced apart by the diameter of one of the stripping wheels plus the thickness of the conductors in the cable from which the insulation is to be stripped.

5. A stripper in accordance with claim 4 wherein a work table having a planar work support surface is disposed crosswise of and at right angles to the plane of the shaft axes, and parallel with the shaft axes, and at a spacing from one of the shaft axes equal to the radius of the wheel on said axis plus the thickness of the conductors to be stripped and plus the thickness of the insulation on the side of the conductor to be stripped away from the axis of the said one of the shaft axes.

6. The method of stripping a multi-conductor cable wherein the conductors are disposed in side-by-side relation and in a common plane, which comprises moving the cable crosswise between spaced stripping wheels of like diameter and like axial length mounted on shafts lying in a common plane, and rotating in the same direction and at approximately the same speeds, the wheels being spaced apart by the approximate thickness of the conductors of the cable from which the insulation is to be stripped.

7. An insulation stripping apparatus comprising a base, a work table having a planar surface across which a multi-conductor cable having conductors disposed side-by-side and in a common plane may be moved, means for supporting a pair of stripping wheel shafts, one above and one below the plane of said table, means for fixing the axis of each of said shafts at predetermined heights above and below said table, means for driving said shafts at like speeds in the same direction, and a pair of fiberglass stripping wheels having opposed cylindrical surfaces secured to each of said shafts respectively and disposed in spaced relation to one another close to the plane of and adjacent an edge of said work table.

8. Apparatus according to claim 7 wherein the shafts rotate on axes parallel with the table surface, and in which the shaft axes lie in a common plane transverse to the plane of the planar surface of the work table.

References Cited

UNITED STATES PATENTS

| 2,383,927 | 8/1945 | Carlson | 51—80 |
| 2,882,188 | 4/1959 | Levin et al. | 81—9.51 X |
| 2,887,702 | 5/1959 | Freitag | 51—80 X |
| 2,902,797 | 9/1959 | Carpenter | 51—80 |
| 2,929,083 | 3/1960 | Davis | 81—9.51 X |
| 3,261,239 | 7/1966 | Moons et al. | 81—9.51 |

MILTON S. MEHR, *Primary Examiner.*